(12) United States Patent
Chung et al.

(10) Patent No.: US 12,464,667 B2
(45) Date of Patent: Nov. 4, 2025

(54) DISPLAY COVER GLASS

(71) Applicant: G-TECH OPTOELECTRONICS CORPORATION, Tongluo Township (TW)

(72) Inventors: Chih-Ming Chung, Tongluo Township (TW); Hsing-Chiao Lin, Tongluo Township (TW); Yuh-Chang Lan, Tongluo Township (TW); Wei-Ting Lin, Tongluo Township (TW)

(73) Assignee: G-TECH OPTOELECTRONICS CORPORATION, Tongluo Township (TW)

( * ) Notice: Subject to any disclaimer, the term of this patent is extended or adjusted under 35 U.S.C. 154(b) by 220 days.

(21) Appl. No.: 18/067,594

(22) Filed: Dec. 16, 2022

(65) Prior Publication Data

US 2023/0199991 A1 Jun. 22, 2023

Related U.S. Application Data

(60) Provisional application No. 63/290,879, filed on Dec. 17, 2021.

(51) Int. Cl.
*H05K 5/03* (2006.01)
*C03B 23/023* (2006.01)

(52) U.S. Cl.
CPC ............. *H05K 5/03* (2013.01); *C03B 23/023* (2013.01)

(58) Field of Classification Search
CPC ............. C03B 23/023; G02F 1/133305; G02F 1/133331; G02F 1/133502; H05K 5/03
See application file for complete search history.

(56) References Cited

U.S. PATENT DOCUMENTS

2018/0052254 A1  2/2018  Takai et al.

*Primary Examiner* — Maria V Ewald
*Assistant Examiner* — Ethan Weydemeyer
(74) *Attorney, Agent, or Firm* — MUNCY, GEISSLER, OLDS & LOWE, P.C.

(57) ABSTRACT

Display cover glass includes a glass substrate. The glass substrate has a first panel and a second panel. An angle formed between the first panel and the second panel. The first panel has a first display area provided with an arbitrary first point. The second panel has a second display area provided with an arbitrary second point. The color difference value ΔE between the first point and the second point is less than or equal to 17 when the viewing angle difference between the first point and the second point is 10-60 degrees. The first panel and the second panel make it possible to display driving information, such as a navigation interface, and an operation interface in the two display areas respectively so that the driver of a means of transport can read the information clearly and use the operation interface with ease.

8 Claims, 3 Drawing Sheets

DISPLAY COVER GLASS

CROSS REFERENCE TO RELATED APPLICATIONS

This application claims priority of U.S. Provisional Application No. 63/290,879 filed on Dec. 17, 2021 under 35 U.S.C. § 119(e), the entire contents of all of which are hereby incorporated by reference.

BACKGROUND OF THE INVENTION

1. Technical Field

The present invention relates to a glass product and more particularly to display cover glass.

2. Description of Related Art

With the advancement of, and as shown by the increasing demand for, electronic data processing, digitization, and touch control technologies, displays have had more and more applications where they are used to show various digital information to their users to enable touch-control operations. Those applications used to serve mainly personal audio-visual entertainment purposes, as a feature of, for example, liquid crystal displays, tablet computers, and laptop computers. Similar applications can then be found in personal communication and mobile devices such as smartphones and smartwatches, and more recently in the dashboards, control panels, or display panels of various means of transport, such as automobiles. The cover glass of a display is a critical component because it protects the display and provides anti-contamination and antiglare, or antireflection, functions as well. If a display is intended for use in, and by the driver of, a means of transport, it is generally required that the design of the display take into account the surroundings of the driver's seat in addition to esthetics and other common design factors of displays, in order to ensure the user's safety; that is to say, displays for such a use have special requirements.

A conventional touch display for use in a means of transport is typically a large, chunky display that can show various information and interfaces such as a navigation interface, a driving information interface, and an operation interface, with the cover glass of the display increasing the range of possible viewing angles to facilitate operation. However, if a driver needs to view or operate the information on such a display while driving, it is likely that the driver will be distracted by having to identify the large amount of information displayed, for the different pieces of information may interfere with each other visually.

BRIEF SUMMARY OF THE INVENTION

One objective of the present invention is to provide display cover glass that provides two display planes for displaying information and an operation interface respectively, and that allows its user to have a clear view of the two planes from the same viewpoint.

To achieve the foregoing objective, the present invention provides display cover glass that includes a glass substrate. The glass substrate has a first panel and a second panel. An angle is formed between the first panel and the second panel. The first panel has a first display area, and the second panel has a second display area. The first panel is provided with an arbitrary first point, and the second panel is provided with an arbitrary second point. The color difference value ΔE between the first point and the second point is less than or equal to 17 when the viewing angle difference between the first point and the second point is 10-60 degrees.

To achieve the foregoing objective, the present invention further provides display cover glass that includes a glass substrate. The glass substrate has a first panel and a second panel. An angle is formed between the first panel and the second panel. The first panel has a first display area, and the second panel has a second display area. The first panel is provided with an arbitrary first point, and the second panel is provided with an arbitrary second point. The color difference value ΔE between the first point and the second point is less than or equal to 7 when the viewing angle difference between the first point and the second point is 10-50 degrees.

To achieve the foregoing objective, the present invention further provides display cover glass that includes a glass substrate. The glass substrate has a first panel and a second panel. An angle is formed between the first panel and the second panel. The first panel has a first display area, and the second panel has a second display area. The first panel is provided with an arbitrary first point, and the second panel is provided with an arbitrary second point. The color difference value ΔE between the first point and the second point is less than or equal to 4 when the viewing angle difference between the first point and the second point is 10-40 degrees.

To achieve the foregoing objective, the present invention further provides display cover glass that includes a glass substrate. The glass substrate has a first panel and a second panel. An angle is formed between the first panel and the second panel. The first panel has a first display area, and the second panel has a second display area. The first panel is provided with an arbitrary first point, and the second panel is provided with an arbitrary second point. The color difference value ΔE between the first point and the second point is less than or equal to 4 when the viewing angle difference between the first point and the second point is 10-30 degrees.

The first display area of the first panel and the second display area of the second panel make it possible to display driving information, such as a navigation interface, and an operation interface in the two display areas respectively so that the driver of a means of transport can read the information clearly and use the operation interface with ease. Moreover, the angle between the first panel and the second panel allows the viewing distance required for viewing the information and the operation distance required for operating the operation interface to be satisfied at the same time to enhance driving safety.

DETAILED DESCRIPTION OF THE INVENTION

Figure 1:
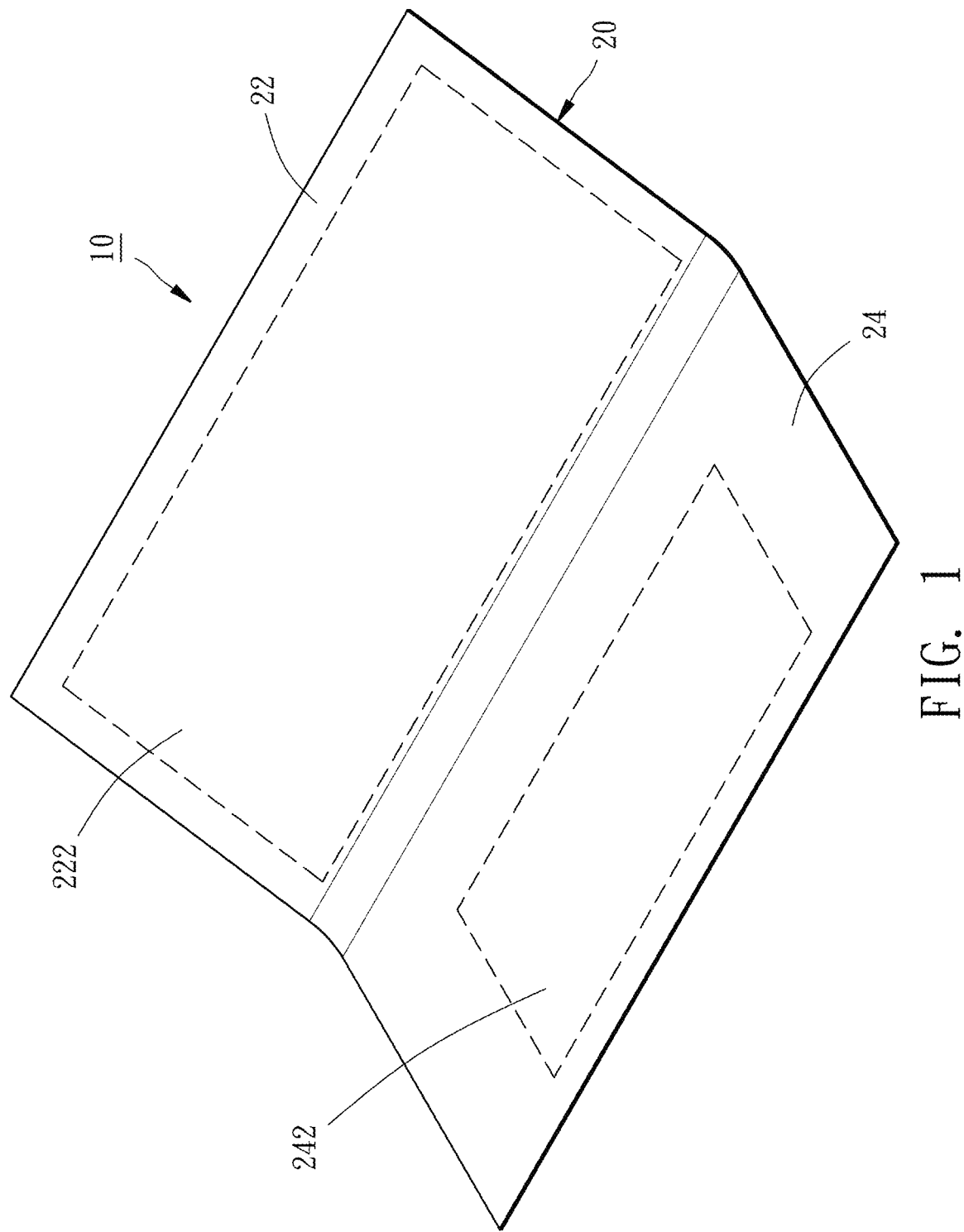
FIG. 1 is a perspective view of the display cover glass according to an embodiment of the present invention.
Figure 2:
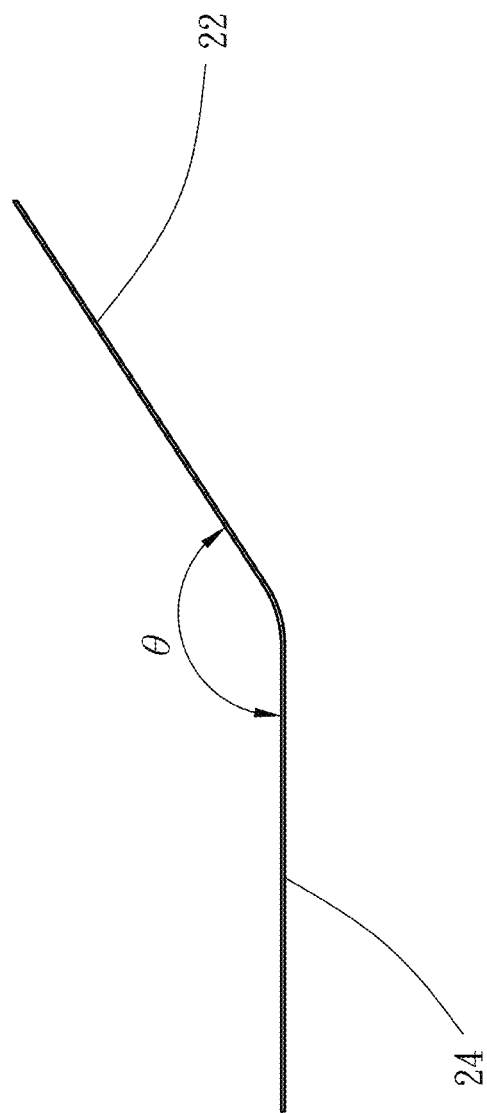
FIG. 2 is a side view of the display cover glass in FIG. 1.
Figure 3:
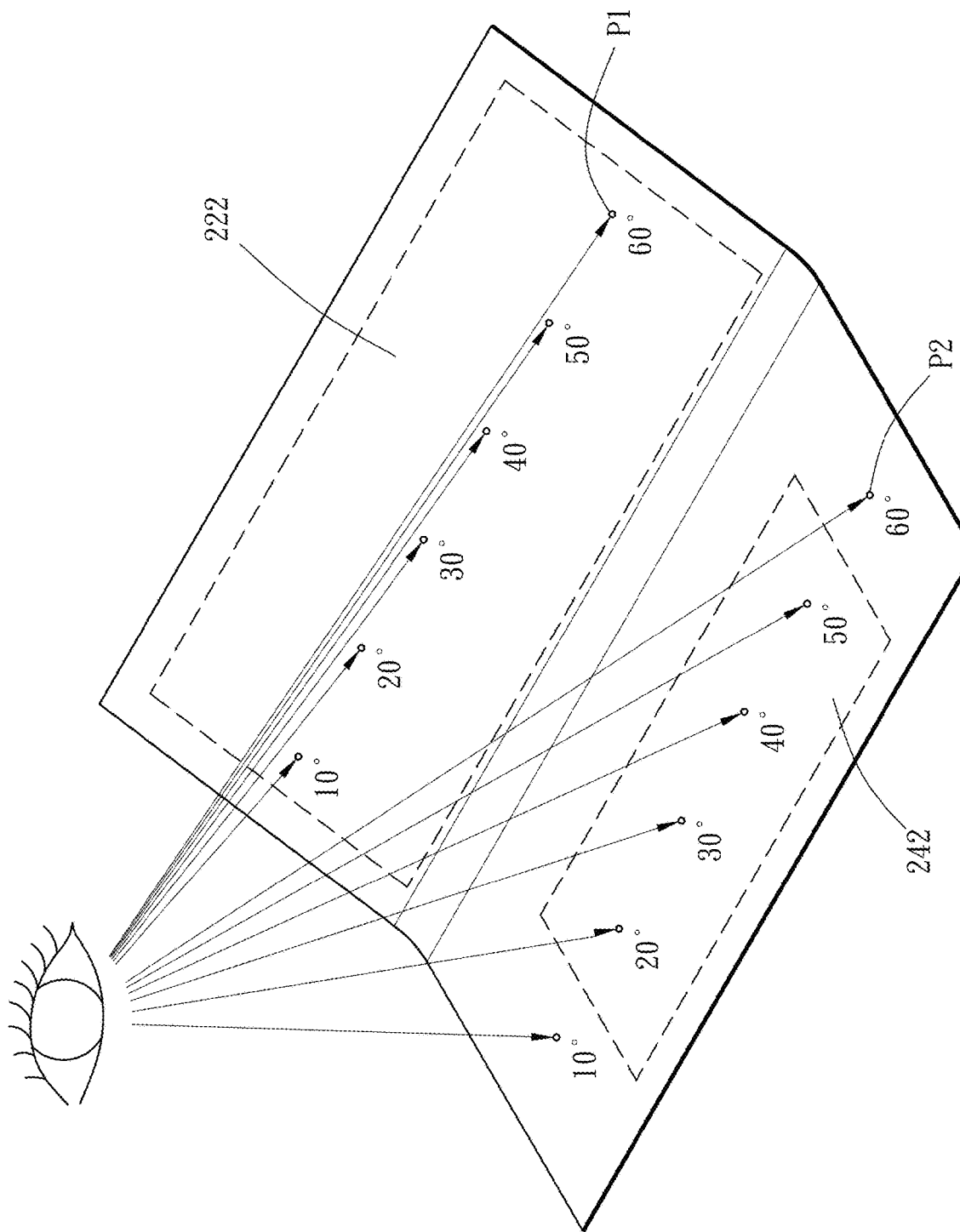
FIG. 3 schematically shows how the color difference between each of a plurality of pairs of points on the first and the second panels of the display cover glass in FIG. 1 is measured, wherein each point is viewed from the same viewpoint and defines a predetermined viewing angle.

Referring to FIG. 1 to FIG. 3, the display cover glass 10 provided by the present invention includes a glass substrate 20. The glass substrate 20 has a first panel 22 and a second panel 24. An angle θ is formed between the first panel 22 and the second panel 24. The first panel 22 has a first display area 222, and the second panel 24 has a second display area 242. The first panel 22 is provided with an arbitrary first point P1, and the second panel 24 is provided with an arbitrary second point P2. Embodiments of the display cover glass 10 can be used in various means of transport, such as means of land transport (e.g., trains, automobiles, trucks, and buses), means of water transport (e.g., yachts, other types of ships/boats, and submarines), and means of air transport (e.g., airplanes, including jet aircraft; and helicopters), and in various home appliances, machines, and building elements.

There is no special limitation on the type of the glass substrate 20. For example, the glass substrate 20 may be alkali-free glass, soda-lime glass, or aluminosilicate glass, preferably soda-lime glass. Considering the safety of use, the glass substrate 20 is preferably tempered glass, wherein the glass tempering method may be chemical toughening, e.g., by immersing glass into a potassium nitrate solution heated to a high temperature such that the sodium ions on the glass surface and the potassium ions in the solution are exchanged. By substituting the sodium ions on the glass surface with potassium ions, which have a larger radius than the sodium ions, the glass surface can be rendered several times as strong as without the ion exchange.

The first panel 22 and the second panel 24 are integrally formed of the glass substrate 20. The angle θ between the first panel 22 and the second panel 24 can be formed by various bending methods, e.g., by heating the glass substrate 20 and then pressing it between molds, or by heating the glass substrate 20 and then creating a vacuum such that the glass substrate 20 attaches compliantly to a mold. The angle θ in this embodiment is between 120 and 175 degrees. During use, the side of the first panel 22 and the second panel 24 that forms the 120 to 175-degree angle θ serves as the front side, i.e., the side to be viewed by the user, and the opposite side, or the backside, is mounted on a fixing mechanism and attached to two displays.

The first display area 222 and the second display area 242 are configured to show various information and interfaces. During use, the backside of the first display area 222 and the backside of the second display area 242 are attached to two different displays respectively, wherein the two displays may be two touch displays, two non-touch displays, or a touch display and a non-touch display. Preferably, the backside of the first display area 222 is attached to a non-touch display, and the backside of the second display area 242 is attached to a touch display, with the first display area 222 displaying, for example, a navigation interface or an information display interface, and the second display area 242 displaying, for example, a control interface or an operation interface. Thus, with view-only information separated from an operable interface, the user can view the information more clearly and operate the interface more easily than when the information and the interface are shown in the same display area. Moreover, the angle θ between the first panel 22 and the second panel 24 allows an appropriate viewing distance between the first display area 222 of the first panel 22 and the user to be maintained while the second display area 242 of the second panel 24 is within the reach of the user's hands, making it easy for the user to perform touch-based control or operation on the second display area 242 when driving a means of transport.

The area of the first display area 222 is equal to or less than that of the first panel 22, and the area of the second display area 242 is equal to or less than that of the second panel 24. Generally, the first display area 222 and the second display area 242 are respectively formed on the first panel 22 and the second panel 24 by spray coating, or by printing on, the backside of the first panel 22 and the backside of the second panel 24, i.e., by coating the peripheral areas of the backsides of the first and the second panels 22 and 24 with black ink and preserving the transparency of the central areas (i.e., the to-be first display area 222 and second display area 242) of the two panels such that the first display area 222 and the second display area 242 are formed on the first panel 22 and the second panel 24 respectively. In one preferred embodiment, the first panel 22 is 300-450 mm in size, the second panel 24 is 300-450 mm in size, and the first display area 222 has a larger area than the second display area 242.

The first panel 22 is provided with an arbitrary first point P1, and the second panel 24 is provided with an arbitrary second point P2. The viewing angle difference between the first point P1 and the second point P2 is defined as the difference between the angle at which the first point P1 is observed from a certain position and the angle at which the second point P2 is observed from the same position. The color difference value ΔE is calculated with the CIE1976 L*a*b* color difference equation adopted by the International Commission on Illumination (CIE), i.e., the color difference value ΔE between two points= $\sqrt{(\Delta L^*)^2+(\Delta a^*)^2+(\Delta b^*)^2}$. L* represents perceptual lightness, i.e., the darkness/lightness of a color, and has a value ranging from 1 to 100. The closer to 0 the L* value, the darker the color, and the closer to 100 the L* value, the lighter the color. a* and b* represent hues, i.e., the appearances of colors. More specifically, a* is the red-green axis (with a positive a* value being red, and a negative a* value being green), and b* is the yellow-blue axis (with a positive b* value being yellow, and a negative b* value being blue).

The measurements and calculations required to determine the color difference value ΔE between each of a plurality of pairs of arbitrary first and second points P1 and P2 on the first and the second panels 22 and 24 that corresponds to a certain viewing angle difference are carried out as follows. An optical detection instrument (e.g., HMT MFS-630, Hong-Ming Technology Co., Ltd.) is used to measure the L* values, a* values, and b* values of six points on the first panel 22 from a fixed position, wherein the six points are so chosen that their measuring angles are 10, 20, 30, 40, 50, and 60 degrees respectively, as shown in FIG. 3. From the same fixed position, the optical detection instrument measures the L* values, a* values, and b* values of six points on the second panel 24 as well, with the measuring angles of these six points also being 10, 20, 30, 40, 50, and 60 degrees respectively. Color difference values ΔE are then calculated with the values obtained from each point on the first panel 22 and the values obtained from each point on the second panel 24, according to predetermined viewing angle differences.

For a viewing angle difference of 10-30 degrees, the point on the first panel 22 that has the 10-degree measuring angle is taken as the first point P1, and the point on the second panel 24 that has the 30-degree measuring angle is taken as the second point P2, in order to calculate the color difference value ΔE between the first point P1 and the second point P2 using the foregoing equation. For a viewing angle difference of 10-40 degrees, the point on the first panel 22 that has the 10-degree measuring angle is taken as the first point P1, and the point on the second panel 24 that has the 40-degree measuring angle is taken as the second point P2, in order to calculate the color difference value ΔE between the first point P1 and the second point P2 using the foregoing equation. For a viewing angle difference of 10-50 degrees, the point on the first panel 22 that has the 10-degree measuring angle is taken as the first point P1, and the point on the second panel 24 that has the 50-degree measuring angle is taken as the second point P2, in order to calculate the color difference value ΔE between the first point P1 and the second point P2 using the foregoing equation. For a viewing angle difference of 10-60 degrees, the point on the first panel 22 that has the 10-degree measuring angle is taken as the first point P1, and the point on the second panel 24 that has the 60-degree measuring angle is taken as the second point P2, in order to calculate the color difference value ΔE between the first point P1 and the second point P2 using the foregoing equation.

The experiment for determining the color difference value ΔE between each pair of points (corresponding respectively to any two viewing angles) on the first panel 22 and the second panel 24 uses display cover glass made by the following manufacturing process. The display cover glass products used in the experiment are made in different batches and are sequentially numbered from example 1 to example 11 before the color difference values ΔE are obtained by the method described above. The manufacturing process of examples 1 to 11 and the process conditions are briefly stated as follows.

To begin with, sheet glass is used as the glass substrate and is cut into an appropriate size and shape. The sheet glass may be purchased from Corning, Nippon Sheet Glass, or Asahi Glass Company. After cutting, the glass substrate is shaped by bending in order to have two panels (namely the first panel and the second panel) that form a predetermined angle therebetween. The surface of the bent glass substrate is subsequently ground to remove the white haze formed on the glass substrate surface during the high-temperature bending process. This surface grinding step, however, is optional. Next, the glass substrate is drilled or is bored on a computer numerical control (CNC) lathe. When the drilling/boring step is completed, the preliminarily shaped glass substrate is immersed in 420° C. molten potassium nitrate for 150 minutes, then removed from the potassium nitrate, and allowed to cool down for 180 minutes, before the chemical toughening step is performed. The chemically toughened glass substrate is then spray-coated or printed to form the first panel and the second panel.

Lastly, an antireflection (AR) layer and an anti-fingerprint (AF) layer are formed on the surface of the first panel and of the second panel. Generally, the AR layer and the AF layer can be formed by various film forming techniques such as sputtering and evaporation. In this manufacturing process, the evaporation method is used to sequentially form the AR layer and the AF layer on the first panel and the second panel. The AR layer is formed by an evaporation machine that performs vacuum evaporation by heating the vapor source with an electron beam (LP-1300 BSD, LP-1600 BSD, or LP-1800 BSD, Lung Pien Vacuum Industry Co. Ltd.). To start with, the glass substrate is fixed above the vapor source by a supporting frame, with a cover plate disposed between the glass substrate and the vapor source. The supporting frame has an umbrella-shaped frame body that has a diameter of 1.3-2.3 meters and a curvature of 20-30°. The glass substrate is fixed on a peripheral area of the supporting frame. (When the evaporation process is performed on a plurality of glass substrates simultaneously, the glass substrates are fixed on the peripheral area of the supporting frame and spaced apart from one another.) The vapor source is silicon dioxide ($SiO_2$), niobium pentoxide ($Nb_2O_5$), or a hydrolytic, fluorine-containing silicide. The vertical distance between the glass substrate on which the AR layer is to be deposited and the vapor source is 1-2 meters. The cover plate may be in the shape of a circle, a triangle with rounded corners, a spindle, or a leaf, and in order to form a film of the desired thickness evenly over the first panel and the second panel at the same time, the cover plate may be an assembly of two circular, round-cornered triangular, spindle-shaped, or leaf-shaped cover plates that correspond to the first panel and the second panel respectively. During the evaporation process, the supporting frame will be rotated at 10-30 revolutions per minute (rpm). After completing the setup described above, a vacuum is created for about 40 minutes until $10^{-4}$-$10^{-6}$ torr is reached. Then, a high voltage is applied to the tungsten wire coil to generate electrons, and the acceleration electrode guides the electrons out as an electron beam. The electron beam is bent by 270° by the bending magnet and is thus guided to hit the metal or metal oxide in the crucible, melting the metal or metal oxide partially. The voltage used is −4 to −10 kV. The evaporation time is about 20-40 minutes, preferably 30 minutes, during which the temperature in the evaporation chamber is kept at 25-250° C., preferably 60-120° C. Lastly, the pressure in the chamber is restored over a course of about 30 minutes to complete the evaporation process. In a high vacuum (e.g., $10^{-4}$-$10^{-6}$ torr), a metal or metal oxide evaporates easily because its melting point is close to its boiling point, and when the resulting vapor flow of the metal or metal oxide contacts a glass substrate, the metal or metal oxide molecules are deposited on the surface of the glass substrate. By adjusting the power of the accelerating voltage, the heating temperature can be adjusted to control the speed of film deposition. In addition, the quartz crystal helps control the thickness of the deposited film and the deposition rate accurately. It is also feasible to use multiple crucibles in the evaporation chamber so that multiple layers of metal film can be continuously grown without having to relieve the vacuum.

Through the evaporation process stated above, a total of eight AR sub-layers are sequentially and evenly formed on the surface of the first panel and of the second panel to make up the AR layer. The first sub-layer is $Nb_2O_5$ and is 10-20 nm thick, the second sub-layer is $SiO_2$ and is 60-70 nm thick, the third sub-layer is $Nb_2O_5$ and is 10-20 nm thick, the fourth sub-layer is $SiO_2$ and is 190-200 nm thick, the fifth sub-layer is $Nb_2O_5$ and is 20-30 nm thick, the sixth sub-layer is $SiO_2$ and is 10-20 nm thick, the seventh sub-layer is $Nb_2O_5$ and is 50-60 nm thick, and the eighth sub-layer is $SiO_2$ and is 60-70 nm thick. After completing the AR layer, a 5-10 nm-thick AF layer is formed on the AR layer with the same evaporation machine and setup, except that a hydrolytic, fluorine-containing silicide is used as the vapor source instead.

TABLE 1

| | First panel | | | | Second panel | | | |
|---|---|---|---|---|---|---|---|---|
| | Measuring angle | L* | a* | b* | Measuring angle | L* | a* | b* |
| Example 1 | 10 | 2.01 | −2.16 | −2.35 | 10 | 1.82 | −1.94 | −2.02 |
| | 20 | 2.24 | −3.18 | −1.35 | 20 | 1.99 | −2.09 | −1.55 |
| | 30 | 2.43 | −3.31 | −0.64 | 30 | 2.69 | −2.61 | −1.12 |
| | 40 | 5.58 | −4.36 | −2.78 | 40 | 5.68 | −3.42 | −2.74 |
| | 50 | 11.24 | −3.84 | −3.96 | 50 | 12.22 | −3.33 | −3.30 |
| | 60 | 25.06 | −3.87 | −5.32 | 60 | 24.58 | −2.60 | −5.13 |
| Example 2 | 10 | 2.50 | −1.73 | −6.04 | 10 | 2.50 | −1.67 | −6.31 |
| | 20 | 2.84 | −2.59 | −5.97 | 20 | 2.76 | −2.08 | −6.16 |
| | 30 | 2.73 | −2.57 | −4.63 | 30 | 3.61 | −2.47 | −6.29 |
| | 40 | 2.95 | −1.80 | −4.21 | 40 | 4.50 | −1.80 | −5.80 |
| | 50 | 11.30 | −1.87 | −7.36 | 50 | 13.24 | −1.08 | −7.50 |
| | 60 | 25.37 | −1.10 | −8.71 | 60 | 25.39 | 0.20 | −8.38 |
| Example 3 | 10 | 2.50 | −1.73 | −6.04 | 10 | 2.50 | −1.67 | −6.31 |
| | 20 | 2.84 | −2.59 | −5.97 | 20 | 2.76 | −2.08 | −6.16 |
| | 30 | 2.73 | −2.57 | −4.63 | 30 | 3.61 | −2.47 | −6.29 |
| | 40 | 2.95 | −1.80 | −4.21 | 40 | 4.50 | −1.80 | −5.80 |
| | 50 | 11.30 | −1.87 | −7.36 | 50 | 13.24 | −1.08 | −7.50 |
| | 60 | 25.37 | −1.10 | −8.71 | 60 | 25.39 | 0.20 | −8.38 |
| Example 4 | 10 | 6.13 | −0.90 | −9.09 | 10 | 6.11 | −0.44 | −10.17 |
| | 20 | 5.72 | −1.38 | −8.19 | 20 | 5.36 | 0.14 | −6.92 |
| | 30 | 5.75 | −0.03 | −6.39 | 30 | 5.98 | 0.64 | −6.69 |
| | 40 | 8.02 | −0.83 | −7.94 | 40 | 9.17 | −0.73 | −9.35 |
| | 50 | 14.21 | 0.03 | −7.50 | 50 | 15.32 | −0.61 | −8.40 |
| | 60 | 24.20 | 0.24 | −7.17 | 60 | 25.46 | −0.73 | −7.62 |
| Example 5 | 10 | 5.59 | −0.92 | −6.89 | 10 | 5.34 | −0.28 | −6.85 |
| | 20 | 5.45 | −0.76 | −6.62 | 20 | 7.48 | 0.24 | −5.59 |
| | 30 | 5.75 | −0.03 | −6.39 | 30 | 5.98 | 0.64 | −6.69 |
| | 40 | 7.92 | 0.24 | −5.69 | 40 | 8.53 | 0.26 | −5.74 |
| | 50 | 13.56 | −0.59 | −3.94 | 50 | 14.50 | −1.46 | −3.94 |
| | 60 | 23.48 | −2.13 | −2.93 | 60 | 24.58 | −3.18 | −2.99 |
| Example 6 | 10 | 7.57 | −0.59 | −6.18 | 10 | 7.53 | 0.08 | −5.91 |
| | 20 | 7.51 | −0.46 | −5.89 | 20 | 7.48 | 0.24 | −5.59 |
| | 30 | 7.90 | −0.35 | −5.23 | 30 | 8.17 | 0.48 | −5.22 |
| | 40 | 10.19 | −0.06 | −4.71 | 40 | 10.52 | 0.05 | −4.39 |
| | 50 | 15.62 | −0.44 | −4.13 | 50 | 15.97 | −1.40 | −3.61 |
| | 60 | 24.97 | −1.02 | −4.20 | 60 | 25.44 | −2.58 | −3.22 |
| Example 7 | 10 | 4.69 | −0.15 | −5.84 | 10 | 4.73 | −0.07 | −5.77 |
| | 20 | 4.46 | −0.27 | −5.14 | 20 | 4.63 | 0.18 | −5.78 |
| | 30 | 4.70 | 0.02 | −5.23 | 30 | 4.87 | 0.42 | −5.55 |
| | 40 | 5.72 | 0.46 | −5.35 | 40 | 6.30 | 0.69 | −5.43 |
| | 50 | 9.50 | 0.67 | −4.62 | 50 | 10.68 | 0.13 | −4.16 |
| | 60 | 18.37 | −0.28 | −2.42 | 60 | 19.86 | −1.45 | −2.06 |
| Example 8 | 10 | 4.61 | −0.09 | −6.40 | 10 | 4.67 | 0.37 | −6.91 |
| | 20 | 4.40 | 0.30 | −6.21 | 20 | 4.82 | 0.72 | −8.19 |
| | 30 | 4.45 | 0.79 | −5.73 | 30 | 4.66 | 0.60 | −6.14 |
| | 40 | 5.21 | 1.28 | −4.87 | 40 | 5.45 | 0.95 | −5.28 |
| | 50 | 8.83 | 2.27 | −2.43 | 50 | 9.01 | 1.44 | −2.82 |
| | 60 | 17.24 | 2.08 | 1.19 | 60 | 19.71 | 2.00 | 1.04 |
| Example 9 | 10 | 2.53 | 1.13 | −1.73 | 10 | 3.11 | 1.60 | −2.95 |
| | 20 | 2.76 | 1.34 | −2.04 | 20 | 3.03 | 1.60 | −2.42 |
| | 30 | 2.78 | 1.20 | −0.38 | 30 | 2.90 | 1.29 | −0.42 |
| | 40 | 4.00 | 1.08 | 0.46 | 40 | 4.53 | 1.13 | 0.70 |
| | 50 | 7.89 | 0.91 | 2.82 | 50 | 8.53 | 0.86 | 2.50 |
| | 60 | 17.55 | 0.89 | 2.72 | 60 | 18.64 | 0.95 | 3.06 |
| Example 10 | 10 | 2.75 | 1.12 | −2.48 | 10 | 2.76 | 0.72 | −2.87 |
| | 20 | 2.68 | 1.35 | −2.31 | 20 | 2.90 | 1.24 | −2.55 |
| | 30 | 2.91 | 1.66 | −1.28 | 30 | 2.09 | 1.40 | −0.46 |
| | 40 | 4.18 | 2.08 | 0.60 | 40 | 4.31 | 2.28 | −0.25 |
| | 50 | 8.33 | 2.56 | 1.98 | 50 | 7.65 | 2.65 | 2.11 |
| | 60 | 16.49 | 2.05 | 3.27 | 60 | 18.10 | 2.16 | 3.64 |
| Example 11 | 10 | 2.61 | 1.16 | −2.57 | 10 | 3.08 | 1.40 | −3.71 |
| | 20 | 3.03 | 1.43 | −2.61 | 20 | 2.84 | 1.38 | −2.32 |
| | 30 | 2.86 | 1.34 | −0.85 | 30 | 2.94 | 1.56 | −1.10 |
| | 40 | 4.29 | 1.59 | 0.92 | 40 | 4.75 | 2.04 | 0.15 |
| | 50 | 7.32 | 0.84 | 2.28 | 50 | 8.63 | 2.03 | 2.12 |
| | 60 | 17.78 | 2.15 | 3.52 | 60 | 18.71 | 2.02 | 3.78 |

| | Color difference value ΔE (L*, a*, b*) | | | |
|---|---|---|---|---|
| | Viewing angle difference: 10-30 degrees | Viewing angle difference: 10-40 degrees | Viewing angle difference: 10-50 degrees | Viewing angle difference: 10-60 degrees |
| Example 1 | 1.47 | 3.90 | 10.32 | 22.75 |
| Example 2 | 1.36 | 2.02 | 10.86 | 23.09 |

TABLE 1-continued

| Example 3 | 1.36 | 2.02 | 10.86 | 23.09 |
|---|---|---|---|---|
| Example 4 | 2.86 | 3.06 | 9.23 | 19.39 |
| Example 5 | 1.62 | 3.36 | 9.40 | 19.51 |
| Example 6 | 1.56 | 3.50 | 8.82 | 18.22 |
| Example 7 | 0.66 | 1.86 | 6.23 | 15.69 |
| Example 8 | 0.74 | 1.75 | 5.87 | 16.96 |
| Example 9 | 1.37 | 3.14 | 7.35 | 16.80 |
| Example 10 | 2.15 | 2.97 | 6.90 | 16.56 |
| Example 11 | 1.56 | 3.57 | 7.68 | 17.33 |

The experimental results are shown in TABLE 1. When the viewing angle difference is 10-30 degrees, the color difference value ΔE between each first point P1 and the corresponding second point P2 on example 1 to example 11 is less than or equal to 4, with the preferred ΔE being less than 3, less than 2, or less than 1. When the viewing angle difference is 10-40 degrees, the color difference value ΔE between each first point P1 and the corresponding second point P2 on example 1 to example 11 is less than or equal to 4, with the preferred ΔE being less than 3 or less than 2. When the viewing angle difference is 10-50 degrees, the color difference value ΔE between each first point P1 and the corresponding second point P2 on examples 7, 8, and 10 is less than or equal to 7, with the preferred ΔE being less than 6. When the viewing angle difference is 10-60 degrees, the color difference value ΔE between each first point P1 and the corresponding second point P2 on examples 7, 8, and 9 is less than or equal to 17, with the preferred ΔE being less than 16.

According to the above, the display cover glass 10 provided by the present invention provides two display planes on the same glass substrate, and the two display planes are at different angles respectively so that the information on the two display planes can be clearly seen from the same viewpoint. For example, driving information (e.g., a navigation interface) and an operation interface can be displayed on the two display planes respectively to allow the driver of a means of transport to read the driving information more clearly and use the operation interface more easily than when the driving information and the operation interface are shown on the same display plane. Furthermore, thanks to the angle between the two display planes, the viewing distance required for viewing the driving information and the operation distance required for operating the operation interface can be satisfied at the same time to enhance driving safety.

It should be pointed out that the detailed description given above with reference to the accompanying drawings provides a mode of implementation solely for the purpose of expounding the technical contents and features of the present invention. A person of ordinary skill in the art who understands the technical contents and features of the invention may make various simple modifications or substitutions or change the number of components without departing from the spirit of the invention. All such modifications, substitutions, and changes shall fall within the scope of the appended claims.

What is claimed is:

1. Display cover glass, comprising:
   a glass substrate having a first panel and a second panel, wherein an angle is formed between the first panel and the second panel, the first panel has a first display area, the second panel has a second display area, the first panel is provided with an arbitrary first point, the second panel is provided with an arbitrary second point, and a color difference value ΔE between the first point and the second point is less than or equal to 17 when a viewing angle difference between the first point and the second point is 10-60 degrees;
   wherein the first point has a 10-degree measuring angle on the first panel and the second point has a 60-degree measuring angle on the second panel from a same position between the interior of the angle respectively;
   wherein an antireflection layer and an anti-fingerprint layer are formed on the surface of the first panel and of the second panel;
   wherein the angle ranges from 120 to 175 degrees.

2. The display cover glass of claim 1, wherein the first point has an L*1 value, an a*1 value, and a b*1 value; the second point has an L*2 value, an a*2 value, and a b*2 value; and the color difference value ΔE between the first point and the second point satisfies the relation $\Delta E = \sqrt{(L^*1-L^*2)^2+(a^*1-a^*2)^2+(b^*1-b^*2)^2} \leq 7$.

3. Display cover glass, comprising:
   a glass substrate having a first panel and a second panel, wherein an angle is formed between the first panel and the second panel, the first panel has a first display area, the second panel has a second display area, the first panel is provided with an arbitrary first point, the second panel is provided with an arbitrary second point, and a color difference value ΔE between the first point and the second point is less than or equal to 7 when a viewing angle difference between the first point and the second point is 10-50 degrees;
   wherein the first point has a 10-degree measuring angle on the first panel and the second point has a 50-degree measuring angle on the second panel from a same position between the interior of the angle respectively;
   wherein an antireflection layer and an anti-fingerprint layer are formed on the surface of the first panel and of the second panel;
   wherein the angle ranges from 120 to 175 degrees.

4. The display cover glass of claim 3, wherein the first point has an L*1 value, an a*1 value, and a b*1 value; the second point has an L*2 value, an a*2 value, and a b*2 value; and the color difference value ΔE between the first point and the second point satisfies the relation $\Delta E = \sqrt{(L^*1-L^*2)^2+(a^*1-a^*2)^2+(b^*1-b^*2)^2} \leq 7$.

5. Display cover glass, comprising:
   a glass substrate having a first panel and a second panel, wherein an angle is formed between the first panel and the second panel, the first panel has a first display area, the second panel has a second display area, the first panel is provided with an arbitrary first point, the second panel is provided with an arbitrary second point, and a color difference value ΔE between the first point and the second point is less than or equal to 4 when a viewing angle difference between the first point and the second point is 10-40 degrees;

wherein the first point has a 10-degree measuring angle on the first panel and the second point has a 40-degree measuring angle on the second panel from a same position between the interior of the angle respectively;

wherein an antireflection layer and an anti-fingerprint layer are formed on the surface of the first panel and of the second panel;

wherein the angle ranges from 120 to 175 degrees.

6. The display cover glass of claim 5, wherein the first point has an $L*1$ value, an $a*1$ value, and a $b*1$ value; the second point has an $L*2$ value, an $a*2$ value, and a $b*2$ value; and the color difference value ΔE between the first point and the second point satisfies the relation $\Delta E = \sqrt{(L*1-L*2)^2+(a*1-a*2)^2+(b*1-b*2)^2} \leq 4$.

7. Display cover glass, comprising:
a glass substrate having a first panel and a second panel, wherein an angle is formed between the first panel and the second panel, the first panel has a first display area, the second panel has a second display area, the first panel is provided with an arbitrary first point, the second panel is provided with an arbitrary second point, and a color difference value ΔE between the first point and the second point is less than or equal to 4 when a viewing angle difference between the first point and the second point is 10-30 degrees;

wherein the first point has a 10-degree measuring angle on the first panel and the second point has a 30-degree measuring angle on the second panel from a same position between the interior of the angle respectively;

wherein an antireflection layer and an anti-fingerprint layer are formed on the surface of the first panel and of the second panel;

wherein the angle ranges from 120 to 175 degrees.

8. The display cover glass of claim 7, wherein the first point has an $L*1$ value, an $a*1$ value, and a $b*1$ value; the second point has an $L*2$ value, an $a*2$ value, and a $b*2$ value; and the color difference value ΔE between the first point and the second point satisfies the relation $\Delta E = \sqrt{(L*1-L*2)^2+(a*1-a*2)^2+(b*1-b*2)^2} \leq 4$.

* * * * *

UNITED STATES PATENT AND TRADEMARK OFFICE
CERTIFICATE OF CORRECTION

| | | |
|---|---|---|
| PATENT NO. | : 12,464,667 B2 | Page 1 of 1 |
| APPLICATION NO. | : 18/067594 | |
| DATED | : November 4, 2025 | |
| INVENTOR(S) | : Chih-Ming Chung et al. | |

It is certified that error appears in the above-identified patent and that said Letters Patent is hereby corrected as shown below:

In the Claims

In Column 10, Line 35, change "$\leq 7$" to --$\leq 17$--.

Signed and Sealed this
Tenth Day of February, 2026

John A. Squires
*Director of the United States Patent and Trademark Office*